(12) United States Patent
Vandergeest

(10) Patent No.: US 6,247,127 B1
(45) Date of Patent: Jun. 12, 2001

(54) METHOD AND APPARATUS FOR PROVIDING OFF-LINE SECURE COMMUNICATIONS

(75) Inventor: Ron J. Vandergeest, Kanata (CA)

(73) Assignee: Entrust Technologies Ltd., Ottawa (CA)

( * ) Notice: Subject to any disclaimer, the term of this patent is extended or adjusted under 35 U.S.C. 154(b) by 0 days.

(21) Appl. No.: 08/994,832

(22) Filed: Dec. 19, 1997

(51) Int. Cl.$^7$ .................................................. G06F 9/44
(52) U.S. Cl. ................................................ 713/100
(58) Field of Search ................................................ 713/100

(56) References Cited

U.S. PATENT DOCUMENTS

| | | | |
|---|---|---|---|
| 4,807,224 | * 2/1989 | Naron et al. | 370/218 |
| 5,191,611 | * 3/1993 | Lang | 705/53 |
| 5,201,000 | * 4/1993 | Matyas et al. | 380/30 |
| 5,261,002 | * 11/1993 | Perlman et al. | 380/30 |
| 5,265,164 | * 11/1993 | Matyas et al. | 380/30 |
| 5,657,390 | * 8/1997 | Elgamal et al. | 713/151 |
| 5,825,890 | * 10/1998 | Elgamal et al. | 713/151 |
| 5,850,442 | * 12/1998 | Muftic et al. | 705/65 |
| 5,872,847 | * 2/1999 | Boyle et al. | 713/151 |
| 5,892,900 | * 4/1999 | Ginter et al. | 713/200 |
| 5,910,987 | * 6/1999 | Ginter et al. | 380/24 |
| 5,915,019 | * 6/1999 | Ginter et al. | 705/54 |
| 5,917,912 | * 6/1999 | Ginter et al. | 713/187 |
| 5,949,876 | * 9/1999 | Ginter et al. | 705/80 |
| 5,982,891 | * 11/1999 | Ginter et al. | 705/54 |
| 6,035,402 | * 3/2000 | Vaeth et al. | 713/201 |
| 6,044,349 | * 3/2000 | Tolopka et al. | 705/1 |

OTHER PUBLICATIONS

Microsoft Press, Computer Dictionary, Third Edition, 84–85, 1997.*
Merriam Webster's Collegiate Dictionary, Tenth Edition, 993, 1185, 1997.*
Bruce Schneier, Applied Cryptography, 29–37, 42–65, 147–53, 425–36, 1994.*

* cited by examiner

*Primary Examiner*—Mark R. Powell
*Assistant Examiner*—Michael Pender
(74) *Attorney, Agent, or Firm*—Vedder, Price, Kaufman & Kammholz

(57) ABSTRACT

A method and apparatus for providing off-line secure communications is accomplished when an end-user is on-line with a security information repository and transmits a request for security information relating to at least one targeted communication entity. The targeted communication entity may be another end-user that has sent the present end-user an encrypted message or another end-user that will receive an encrypted message from the present end-user. In response to the request, the present end-user subsequently receives the security information and updates a local security information repository (e.g., cache memory) with the security information related to the at least one targeted communication entity. Having updated the local security information repository, the current end-user goes off-line from the security information repository. While off-line, the current end-user confidently processes a secure communication with the at least one targeted communication entity based on the security information that is stored in the local security information repository.

29 Claims, 3 Drawing Sheets

METHOD AND APPARATUS FOR PROVIDING OFF-LINE SECURE COMMUNICATIONS

TECHNICAL FIELD OF THE INVENTION

This invention relates generally to secured communications and more particularly to a method and apparatus for extending secure communications to off-line devices, such as laptop computers.

BACKGROUND OF THE INVENTION

As is known, to securely transmit data from one party to another in a secure communication system, the data needs to be encrypted via an encryption key and an encryption algorithm. The encryption algorithm may be a symmetric key algorithm such as the data encryption standard ("DES"), while the encryption key may be a corresponding symmetric key. The sending party encrypts the data using the symmetric key algorithm and transmits the encrypted message over a transmission medium to a receiving party. Upon receiving the encrypted message, the receiving party decrypts the message using the same symmetric key, which must be transmitted to the receiving party or derived by the receiving party by some appropriate security means.

Encrypting data using public key algorithms is somewhat more expensive than using a symmetric key algorithm, but, the cost is generally justified because of the difficulty in securely providing the symmetric key to both parties. To obtain the cost saving benefits of symmetric key encryption and the key distribution advantages of public/private key pairs, a wrapped session key is provided to the receiving party, or parties, along with the data that is encrypted using the symmetric key. The wrapped session key is the symmetric key that has been encrypted using the public key (of the public/private key pair) of the receiving party. When the receiving party receives the encrypted message, it decrypts the wrapped session key using its private key to recapture the symmetric key. Having recaptured the symmetric key, the receiving party utilizes it to decrypt the message. Typically, symmetric keys are used for a relatively short duration (e.g., a communication, a set number of communications, an hour, a day, a few days, etc.), while encryption public keys are used for longer durations (e.g., a week, a month, a year, or more).

To further enhance security of encrypted data transmissions in the secured communication system, the sending party provides its digital signature with encrypted messages that it transmits. The signature of the sending party consists of a tag computed as a function of both the data being signed and the signature private key of the sender. The receiving party using a corresponding signature public key of the sending party can validate the signature. To ensure that the receiving party is using an authentic public key of the sending party, it obtains a signature public key certificate from the directory or a certification authority. The signature public key certificate includes the signature public key of the sending party and the signature of the certification authority. After obtaining the certificate, the receiving party first verifies the signature of the certification authority using a locally stored trusted public key of the certification authority. Once the signature of the certification authority has been verified, the receiving party can trust any message that was signed by the certification authority. Thus, the signature public key certificate that the receiving party obtained is verified and the signature public key of the sending party can be trusted to verify the signature of the sending party of the message.

The above process works well when the end-users, via a computer or similar device, are directly coupled, i.e., on-line, with the communication system. When on-line with the communication system, an end-user has access to the directory such that it may obtain the encryption public key certificate of a targeted recipient and the signature public key certificate of a sending party. In addition, the end-user has access, via the directory, to certificate revocation lists and authority revocation list. The end-user utilizes the certificate and authority revocation lists, which are issued periodically (e.g., daily), to verify that the certificates it has obtained are valid, i.e., have not been revoked and have not been signed by a certification authority that has had it authority revoked. Thus, as long as an end-user has access to the directory, it can retrieve and utilize encryption public key certificates and signature public key certificates with confidence.

If a lap-top end-user is off-line from the communication system, i.e., does not have access to the directory, it cannot confidently utilize the encryption public key certificates and signature public key certificates that it has stored. The lack of confidence results when the end-user's local copies of the certificate and authority revocation lists are expired, i.e., the period for reissue has past. This, of course, assumes that the end-user has a local copy of the revocation lists. As such, the locally stored certificates are untrustworthy. While untrustworthy certificates do not prevent the physical act of encrypting and verifying, they do defeat the spirit of encrypting and verifying which devoid the security system of its integrity. As such, off-line users, especially laptop computer users, cannot securely verify signatures of received messages (e.g., e-mail messages) and cannot securely prepare outgoing messages.

Therefore, a need exists for a method and apparatus that provides off-line secure communications.

DETAILED DESCRIPTION OF A PREFERRED EMBODIMENT

Generally, the present invention provides a method and apparatus for providing off-line secure communications. This is accomplished when an end-user is on-line with a security information repository and transmits a request for security information relating to at least one targeted communication entity. The targeted communication entity may be another end-user that has sent the present end-user an encrypted message or another end-user that will receive an encrypted message from the present end-user. In response to the request, the present end-user subsequently receives the security information and updates a local security information repository (e.g., cache memory) with the security information related to the at least one targeted communication entity. Having updated the local security information repository, the current end-user goes off-line from the security information repository. While off-line, the current end-user confidently processes a communication with the at least one targeted communication entity based on the security information that is stored in the local security information repository. With such a method and apparatus, the present invention allows end-users to go off-line from a security information repository (e.g., a directory, a certification authority, or a server), and confidently participate in secure communications. As such, an end-user, while off-line, may securely and in a trustworthy manner, read encrypted e-mail messages, prepare secure outgoing messages, access encryption protected folders, etc.

Figure 1:
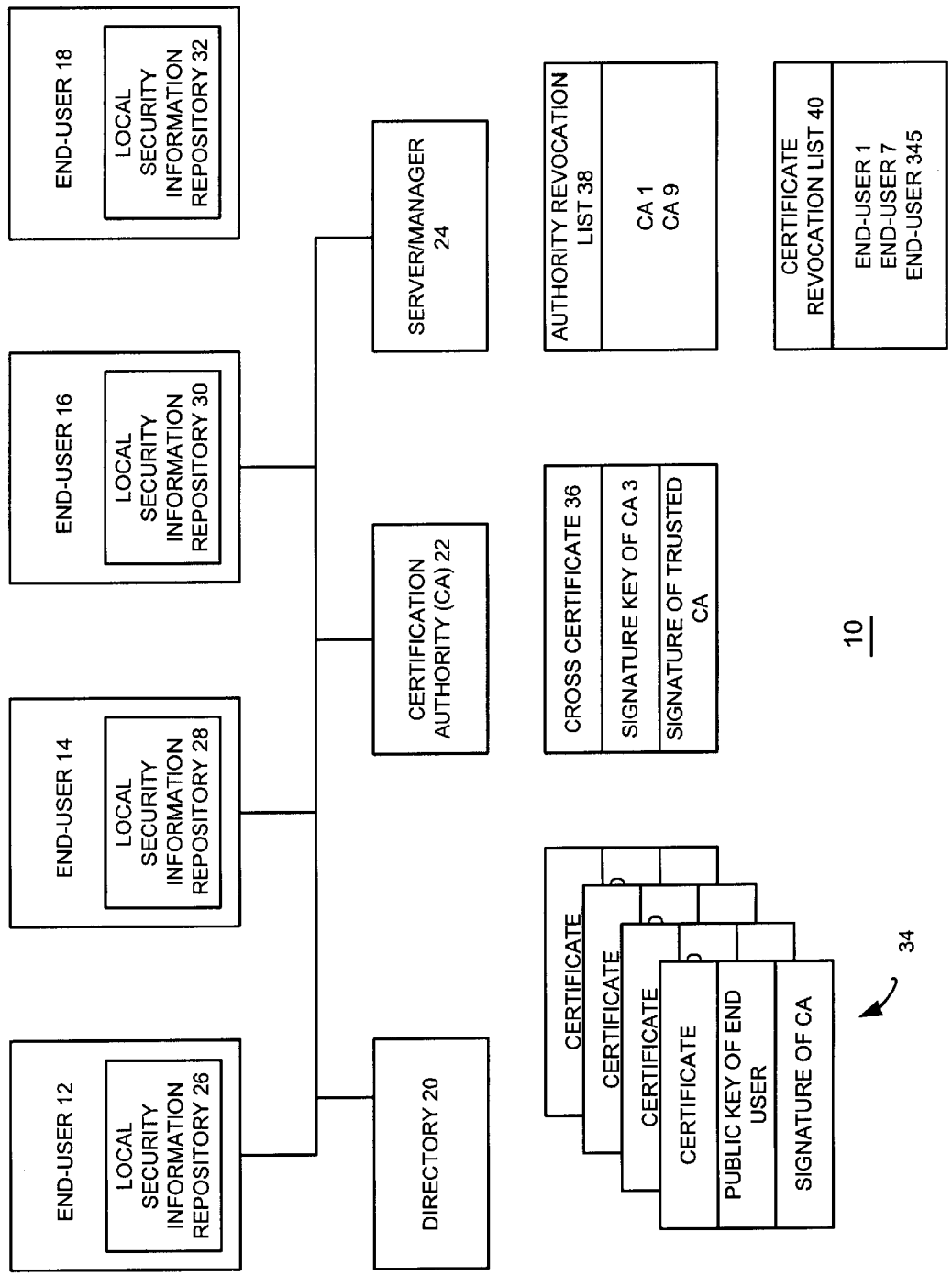
FIG. 1 illustrates a schematic block diagram of a secure communication system in accordance with the present invention.

The present invention can be more fully described with reference to FIGS. 1 through 3. FIG. 1 illustrates a secure communications system 10 that includes a plurality of end-users 12–18, a directory 20, a certification authority ("CA") 22, a server/manager 24. Each of the end-users 12–18 may be computers, laptop computers, personal digital assistance, or any other device that processes digital information based on programming instructions. The end-users 12–18 each include security software to process secure communication, such as Entrust/Client software manufactured and distributed by Entrust Technologies, Ltd. as modified by the present invention. The end-users 12–18 further include a local security information repository 26–32, which may be cache memory, random access memory, or any other means for storing digital information in a read/write manner.

The server/manager 24 may be a personal computer, workstation, or any other device that manipulates digital information based on programming instructions. The server/manager 24 provides security management for the end-users, which includes key recovery, new key allocation, key deletion, etc. To facilitate the managerial functions, the server/manager 24 includes security management software such as Entrust/Manager as modified by the present invention, where the Entrust/Manager is manufactured and distributed by Entrust Technologies Ltd. The certification authority 22 performs policy control for the communication system, which includes generating encryption and signature public key certificates, establishing cross certificates, etc. The certification authority 22 may be separate computing device or embodied in the same device as the server/manager 24. The directory 20 is a database that stores the encryption and signature public key certificates 34, cross certificates 36, authority revocation lists 38, and certificate revocation lists 40. Note that the directory may be a standalone database, memory within the server/manager 24, and/or memory within the certification authority 22.

The certificates 34 each include a public key of a particular end-user in the communication system. Each certificate 34 also includes a signature of a certification authority. When a user receives the certificate, it verifies the signature of the certification authority and once verified, can confidently use the public key of the end-user to encrypt and/or verify signatures of the end-user identified in the certificate. The cross-certificates 36 each include the signature key of a certification authority and the signature of a trusted certification authority. With a cross-certificate, an end-user may use the signature of another certification authority 3 to verify certificates signed by the another certification authority. This can only be done if a trusted certification authority signs the cross certificate. The authority revocation list 38 indicates which certification authorities have lost their status as a certification authority. In other words, the authority revocation list 38 indicates which certification authorities' signatures can no longer be trusted. The certificate revocation list 40 includes a list of end-users whose certificates have been revoked.

In operation, end-users 12–16, which are operably coupled to the directory 20, certification authority 22, and the server/manager 24, can directly access the directory 20 to obtain certificates of interest and verify that they have not been revoked by using the revocation lists 38 and 40. As long as end-users 12–16 remain coupled to the communications system 10, they can confidently verify signatures of received messages (including e-mail messages) and/or encrypt outgoing messages.

End-user 18, however, is not directly coupled to the communication system 10 and, thus does not have direct access to the certificates 34, cross certificates 38, authority revocation lists 38, and certificate revocation list 40. For end-user 18 to participate in secure communications (i.e., be able to verify signatures of received messages and to prepare encrypted outgoing messages), it would request the most current security information relating to end-users of interest to end-user 18 before going off-line. The end-users of interest may be a pre-established group such as a recipient list, a user defined list, or a system default list. The security information includes at least one of the certificates 34, cross-certificates 38, and revocation lists 38, 40. By downloading security information just prior to going off-line, an end-user may confidently participate in secure communications. Typically, the off-line user will only be able to confidently use the security information for a fixed period of time, wherein the fixed period of time relates to the frequency at which the revocation lists 30\8, 40 are updated. The process of obtaining security information is more fully described with reference to FIGS. 2 and 3.

Figure 2:
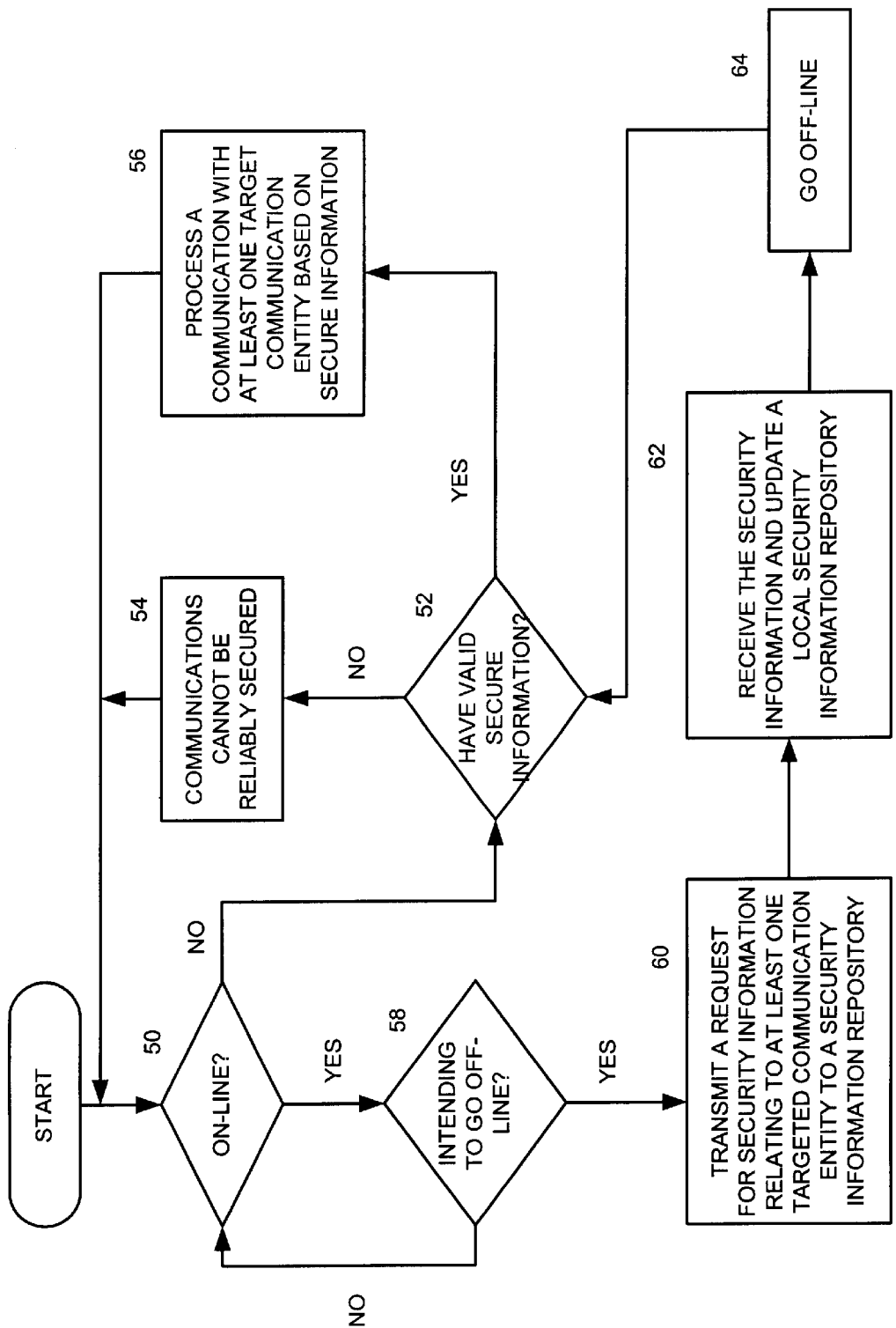
FIG. 2 illustrates a logic diagram of a method for processing secure off-line communications in accordance with the present invention.

FIG. 2 illustrates a logic diagram of a method for providing an end-user off-line secured communications. The process begins at step 50 where a determination is made as to whether the end-user is on-line. If the end-user is on-line, the process proceeds to step 58 where a determination is made as to whether the end-user intends to go off-line. If not, the process waits for the end-user to go off-line.

If, at step 50, it is determined that the end-user is off-line, the process proceeds to step 52 where a determination is made as to whether the end-user has valid secure information. The secure information includes the certificates of end-users, or targeted communication entities. While the off-line end-user may receive the certificates for all other end-users of the system, typically, the off-line end-user will only request the certificates of end-users of interest, i.e., ones that will be involved in a secure communication with the off-line end-user. The secure information may further include cross-certificates 38, an authority revocation list 38, and a certificate revocation list 40. The off-line end-user verifies the secure information by comparing a time stamp of the security information with a validity period, which is based on the frequency at which the revocation lists 38 and 40 are updated. Thus if the revocation list 38 and 40 are updated daily, the validity period is 24 hours.

The off-line end-user may further verify the security information by ensuring that a trust party (e.g., a trusted certification authority) signed the security information and the trusted party is not identified on the authority revocation list. The off-line end-user may still further verify the security information by determining that certificate of the at least one targeted communication is not on the certificate revocation list. The off-line end-user may even further verify the security information by ensuring that appropriate key usage, i.e., encryption keys are used for encryption purposes and verification keys are used for verification purposes. The off-line end-user may still even further verify the security information by ensuring policy compliance regarding the security information and messages based thereon. The policy may indicate that an end-user is not generate particular data, communicate with particular end-users, or encrypt information in a particular manner. For example, the policy may indicate that a particular end-user has purchasing power up to $5,000.00. Thus, any message created by the end-user relating to purchases would be verified in accordance with the policy such that the end-user could not exceed the $5,000 purchase limit.

If, at step 52, the remote end-user does not have valid secure information, the process proceeds to step 54. At step 54, communications cannot be reliably secured. In other words, the remote end-user has a choice of not participating in secure communications (e.g., reading secured e-mail, secured files, and secured documents or encrypting outgoing messages) or the end-user may utilize the untrustworthy security information to read secured communications. If, however, the end-user has valid security information, the process proceeds to step 56 where a communication is processed with at least one target communication entity based on the secure information. The communication may be processed by verifying signature of data (e.g., an e-mail document, a file, a document, or any data container), decrypting data, signing data, and/or encrypting data. Having done this, the process reverts back to step 50.

If, at step 58, it is determined that the end-user intends to go off-line, the process proceeds to step 60. At step 60, the end-user transmits a request to a security information repository, wherein the request is requesting security information related to at least one targeted communication entity. The request may be sent to a communication system directory, a certification authority, and/or a communication system server and/or manager, whichever entity is functioning as the security information repository. The request may further be requested security information for an individual end-user, a pre-established group of end-users, a plurality of specified end-users, a certification authority, and/or a server. The request may further be requesting, as the security information, a certificate of the at least one targeted communication entity, a certificate revocation list, an authority revocation list, a cross-certificate, and/or a trusted public key of at least one targeted communication entity.

The process then proceeds to step 62 where the end-user receives the security information and updates a local security information repository, which may be a local cache memory, random access memory, or any other device that stores digital information. Having done this, the process proceeds to step 64 where the end-user goes off-line. Once off-line, the processing steps of 52–56 are performed for each secure communication of the end-user.

Figure 3:
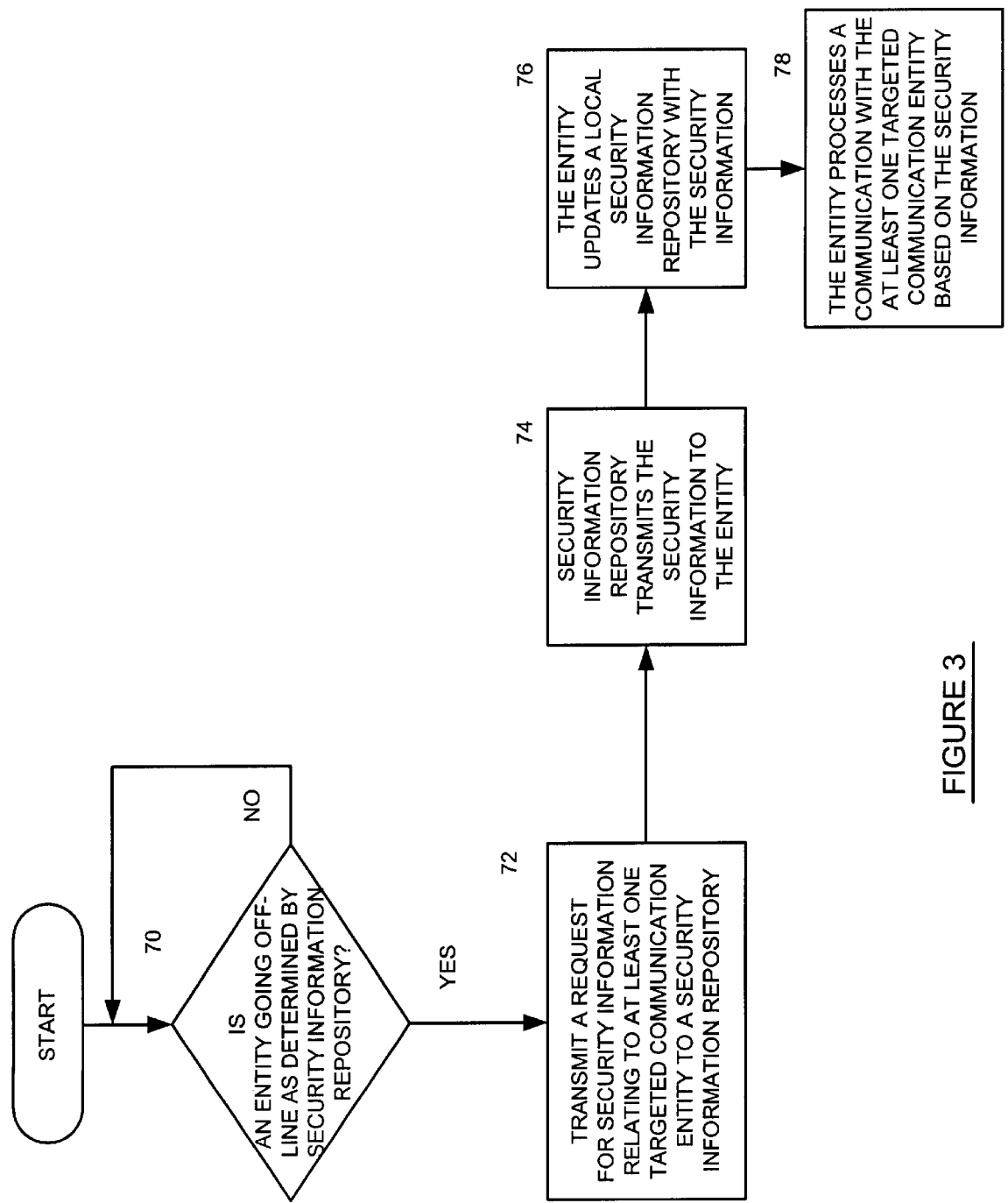
FIG. 3 illustrates a logic diagram of an alternate method for processing off-line secure communications in accordance with the present invention.

FIG. 3 illustrates a logic diagram of an alternate method for providing off-line secure communications. The process begins at step 70 where a determination is made as to whether an entity is going off-line. The security information repository, which may be the certification authority and/or the server/manager, may make this determination. Alternatively, the determination may be made by receiving a request for the security information from an end-user going off-line. As another alternative, the security information repository may periodically update of the security information to end-users, such that the periodic updating is used to make the determination. If the entity is not going offline, the process waits until a determination is made that it intends to go off-line.

Once the entity is going off-line, the process proceeds to step 72. At step 72, the security information repository determines security information of at least one targeted communication entity, which is a participant in a communication with the end-user going off-line. The secure information repository may determine the particular targeted communication entities by querying the end-user, accessing a list of secure incoming messages for the end-user, accessing a pre-established list of targeted communication entities and/or a default list or targeted entities.

The process then proceeds to step 74 where the security information repository transmits the secure information to the entity, or end-user. The process then proceeds to step 76 where the entity going off-line updates a local security information repository with the secure information. Having done this, the entity goes off-line and processes communications with the at least one targeted communication entity based on the security information.

The preceding discussion has presented a method and apparatus for allowing end-users that are off-line from a communications system to participate in secure communications. As such, when a particular end-user is off-line (e.g., in an airplane) and desires to access his or her secure e-mail messages, the end-user may do so utilizing the present invention. By providing an end-user with the most current security information just prior to the end-user going off-line, the end-user may participate in secured communications off-line for the duration of the validity period.

What is claimed is:

1. A method for providing off-line secure communications, the method comprises the steps of:
   a) while on-line with a security information repository, and in response to a determination that an entity is going off-line, transmitting, to the security information repository, a request for security information relating to at least one targeted communication entity;
   b) receiving the security information relating to the at least one targeted communication entity;
   c) updating a local security information repository with the security information relating to the at least one targeted communication entity;
   d) while off-line from the security information repository, processing a communication with the at least one targeted communication entity based on the security information.

2. The method of claim 1 further comprises, within step (a), requesting the security information from at least one of: a communication system directory, a certification authority, and a communication system server.

3. The method of claim 1 further comprises, within step (a), requesting the security information for at least one of: each entity in a pre-established group, a specified end-user, a plurality of specified end-users, a certification authority, and a server.

4. The method of claim 1 further comprises, within step (a), requesting as the security information at least one of: a certificate of the at least one targeted communication entity, a certificate revocation list, an authority revocation list, a cross certificate, and a trusted public key of the at least one targeted communication entity.

5. The method of claim 1 further comprises, within step (d), verifying validity of the security information, the verifying includes at least one of:
   i) verifying the security information is within a validity period;
   ii) verifying that the security information was signed by a trusted party;
   iii) determining that the trusted party is not identified in an authority revocation list;
   iv) determining that a certificate of the at least one target communication entity is not identified in a certificate revocation list;

v) determining appropriate key usage of the security information; and vi) determining policy compliance of the processing of the communication.

6. The method of claim 1 further comprises, within step (d), processing the communication by at least one of: verifying signature of data, decrypting data, signing data, and encrypting data.

7. A method for providing off-line secure communications, the method comprises the steps of:
   a) while on-line with a security information repository, receiving the security information relating to the at least one targeted communication entity from the security information repository in response to determining that an entity is going off-line;
   b) storing the security information relating to the at least one targeted communication entity; and
   c) while off-line from the security information repository, processing a communication with the at least one targeted communication entity based on the security information.

8. The method of claim 7 further comprises, within step (a), receiving the security information as at least one of: a response to a request, a periodic update provided by the security information repository, and an automated detection of off-line activation.

9. The method of claim 7 further comprises, within step (a), receiving the security information for at least one of: each entity in a pre-established group, a specified end-user, a plurality of specified end-users, a certification authority, and a server.

10. The method of claim 7 further comprises, within step (a), receiving as the security information at least one of: a certificate of the at least one targeted communication entity, a certificate revocation list, an authority revocation list, a cross certificate, and a trusted public key of the at least one targeted communication entity.

11. The method of claim 7 further comprises, within step (c), processing the communication by at least one of: verifying signature of data, decrypting data, signing data, and encrypting data.

12. A method for providing off-line secure communications, the method comprises the steps of:
   a) determining that an entity is going off-line;
   b) determining, by the security information repository, security information of at least one targeted communication entity when the entity is going off-line, wherein the at least one targeted communication entity is a participant in a communication with the entity;
   c) transmitting, by the security information repository, the security information to the entity prior to the entity going off-line;
   d) updating, by the entity, a local security information repository with the security information; and
   e) while off-line from the security information repository, processing, by the entity, the communication with the at least one targeted communication entity based on the security information.

13. The method of claim 12 further comprises, within step (a), determining that the entity is going off-line by receiving a request for the security information based on a determination that the entity is going off-line.

14. The method of claim 12 further comprises, within step (b), determining the security information to be for at least one of: each entity in a pre-established group, a specified end-user, a plurality of specified end-users, a certification authority, and a server.

15. The method of claim 12 further comprises, within step (b), determining the security information to be at least one of: a certificate of the at least one targeted communication entity, a certificate revocation list, an authority revocation list, a cross certificate, and a trusted public key of the at least one targeted communication entity.

16. The method of claim 12 further comprises, within step (e), processing the communication by at least one of: verifying signature of data, decrypting data, signing data, and encrypting data.

17. A digital information storage device that stores programming instructions that, when read by a processing unit, causes the processing unit to process off-line secure communication services, the digital information storage device comprises:
   first means for storing programming instructions that, when read by the processing unit, causes the processing unit to receive the security information relating to the at least one targeted communication entity from the security information repository while on-line with a security information repository in response to determining that an entity is going off-line;
   second means for storing programming instructions that, when read by the processing unit, causes the processing unit to store the security information relating to the at least one targeted communication entity; and
   third means for storing programming instructions that, when read by the processing unit, causes the processing unit to process a communication with the at least one targeted communication entity based on the security information while off-line from the security information repository.

18. The digital information storage device of claim 17 further comprises means for storing programming instructions that, when read by the processing unit, causes the processing unit to request the security information from at least one of: a communication system directory, a certification authority, and a communication system server.

19. The digital information storage device of claim 17 further comprises means for storing programming instructions that, when read by the processing unit, causes the processing unit to receive the security information as at least one of: a response to a request, a periodic update provided by the security information repository, and an automated detection of off-line activation.

20. The digital information storage device of claim 17 further comprises means for storing programming instructions that, when read by the processing unit, causes the processing unit to receive the security information for at least one of: each entity in a pre-established group, a specified end-user, a plurality of specified end-users, a certification authority, and a server.

21. The digital information storage device of claim 17 further comprises means for storing programming instructions that, when read by the processing unit, causes the processing unit to receive as the security information at least one of: a certificate of the at least one targeted communication entity, a certificate revocation list, an authority revocation list, a cross certificate, and a trusted public key of the at least one targeted communication entity.

22. The digital information storage device of claim 17 further comprises means for storing programming instructions that, when read by the processing unit, causes the processing unit to process the communication by at least one of: verifying signature of data, decrypting data, signing data, and encrypting data.

23. The digital information storage device of claim 17 further comprises means for storing programming instructions that, when read by the processing unit, causes the processing unit to verify validity of the security information, the verifying includes at least one of:

i) verifying the security information is within a validity period;

ii) verifying that the security information was signed by a trusted party;

iii) determining that the trusted party is not identified in an authority revocation list;

iv) determining that a certificate of the at least one target communication entity is not identified in a certificate revocation list;

v) determining appropriate key usage of the security information; and vi) determining policy compliance of the processing of the communication.

24. A digital information storage device that stores programming instructions that, when read by at least one processing unit, causes the at least one processing unit to process off-line secure communication services, the digital information storage device comprises:

first means for storing programming instructions that, when read by the at least one processing unit, causes the at least one processing unit to function as a security information repository to determine that an entity is going off-line;

second means for storing programming instructions that, when read by the at least one processing unit, causes the at least one processing unit to function as the security information repository to determine security information of at least one targeted communication entity when the entity is going off-line, wherein the at least one targeted communication entity is a participant in a communication with the entity; and third means for storing programming instructions that, when read by the at least one processing unit, causes the at least one processing unit to function as the security information repository to transmit the security information to the entity prior to the entity going off-line.

25. The digital information storage device of claim 24 further comprises means for storing programming instructions that, when read by the at least one processing unit, causes the at least one processing unit to function as the entity to update a local security information repository with the security information and to function as the entity to process the communication with the at least one targeted communication entity based on the security information while off-line from the security information repository.

26. The digital information storage device of claim 24 further comprises means for storing programming instructions that, when read by the at least one processing unit, causes the at least one processing unit to determine that the entity is going off-line by at least one of: receiving a request for the security information, providing a periodic update of the security information, and detecting off-line activation by the entity.

27. The digital information storage device of claim 24 further comprises means for storing programming instructions that, when read by the at least one processing unit, causes the at least one processing unit to determine the security information to be for at least one of: each entity in a pre-established group, a specified end-user, a plurality of specified end-users, a certification authority, and a server.

28. The digital information storage device of claim 24 further comprises means for storing programming instructions that, when read by the at least one processing unit, causes the at least one processing unit to determine the security information to be at least one of: a certificate of the at least one targeted communication entity, a certificate revocation list, an authority revocation list, a cross certificate, and a trusted public key of the at least one targeted communication entity.

29. The digital information storage device of claim 24 further comprises means for storing programming instructions that, when read by the at least one processing unit, causes the at least one processing unit to process the communication by at least one of: verifying signature of data, decrypting data, signing data, and encrypting data.

* * * * *